United States Patent
Gupta et al.

(10) Patent No.: US 9,552,378 B2
(45) Date of Patent: Jan. 24, 2017

(54) METHOD AND APPARATUS FOR SAVING SEARCH QUERY AS METADATA WITH AN IMAGE

(71) Applicant: Adobe Systems Incorporated, San Jose, CA (US)

(72) Inventors: Gaurav Gupta, Rohini (IN); Divesh Nayyar, Delhi (IN); Saurav Gupta, Rohini (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 200 days.

(21) Appl. No.: 14/086,332

(22) Filed: Nov. 21, 2013

(65) Prior Publication Data

US 2015/0142779 A1    May 21, 2015

(51) Int. Cl.
   *G06F 17/30* (2006.01)
(52) U.S. Cl.
   CPC ..... *G06F 17/3028* (2013.01); *G06F 17/30268* (2013.01)
(58) Field of Classification Search
   CPC .................... G06F 17/30268; G06F 17/30265; G06F 17/3028
   See application file for complete search history.

(56) References Cited

U.S. PATENT DOCUMENTS

| | | | | |
|---|---|---|---|---|
| 8,417,712 B2* | 4/2013 | Narayanan | ........ | G06F 17/30265 707/749 |
| 2006/0115108 A1* | 6/2006 | Rodriguez | ........ | G06F 17/30265 382/100 |
| 2007/0011171 A1* | 1/2007 | Nurminen | ............... | H04L 67/18 |
| 2009/0119254 A1* | 5/2009 | Cross | ................ | G06F 17/30867 |
| 2010/0325706 A1* | 12/2010 | Hachey | ................. | H04L 9/3271 726/6 |
| 2011/0270816 A1* | 11/2011 | Gossel | ............. | G06F 17/30864 707/706 |
| 2014/0279994 A1* | 9/2014 | Gulli | ................. | G06F 17/30864 707/706 |

* cited by examiner

*Primary Examiner* — Kris Mackes
(74) *Attorney, Agent, or Firm* — Keller Jolley Preece

(57) ABSTRACT

A computer implemented method and apparatus for saving a search query as metadata with an image, comprising receiving image search results from an image search string query, receiving one or more image files from the image search results as one or more selected image files for storage, generating metadata based on the image search string query, associating the metadata with the one or more selected image files, and storing the one or more selected image files with the metadata.

20 Claims, 7 Drawing Sheets

METHOD AND APPARATUS FOR SAVING SEARCH QUERY AS METADATA WITH AN IMAGE

BACKGROUND

Field

Embodiments of the present invention generally relate to searching techniques and, more particularly, to a method to save a search query as metadata with an image.

Description of the Related Art

Currently, finding images via searching on the Internet using a search engine results in a web history unique to the searching service or web browser cache. When saving images from returned results, a file is created and saved of a default or a user defined filename. Each saved file is independent from one another and does not include history information of where the image originated. In addition, often the browser or searching service cache is cleared leaving the user to remember where an image file is stored and where it originated.

Therefore, there is a need for a method for a reliable and accurate method to save and store images that facilitates retrieval of those images as well as similar images.

SUMMARY OF THE INVENTION

A method which saves a search query as metadata with an image. The method involves receiving search results from a submitted search string and generating metadata based on the search string. The metadata is selectively associated to any images from search results selected for storage.

In another embodiment, an apparatus for saving a search query as metadata with an image is described. The apparatus includes a computer having one or more processors. A communications module receives image results for an image search query using a search string from the Internet. The apparatus generates metadata based on the search string using a processing module. The apparatus associates the metadata with selected image files of the image results for storage and selectively stores the selected image files with the associated metadata.

In yet another embodiment, a computer readable medium for saving a search query as metadata with an image is described. The computer readable medium stores computer instructions that, when executed by at least one processor causes the at least one processor to perform a method for saving a search query as metadata with an image. The method involves receiving search results from a submitted search string and generating metadata based on the search string. The metadata are selectively associated to any images from search results selected for storage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
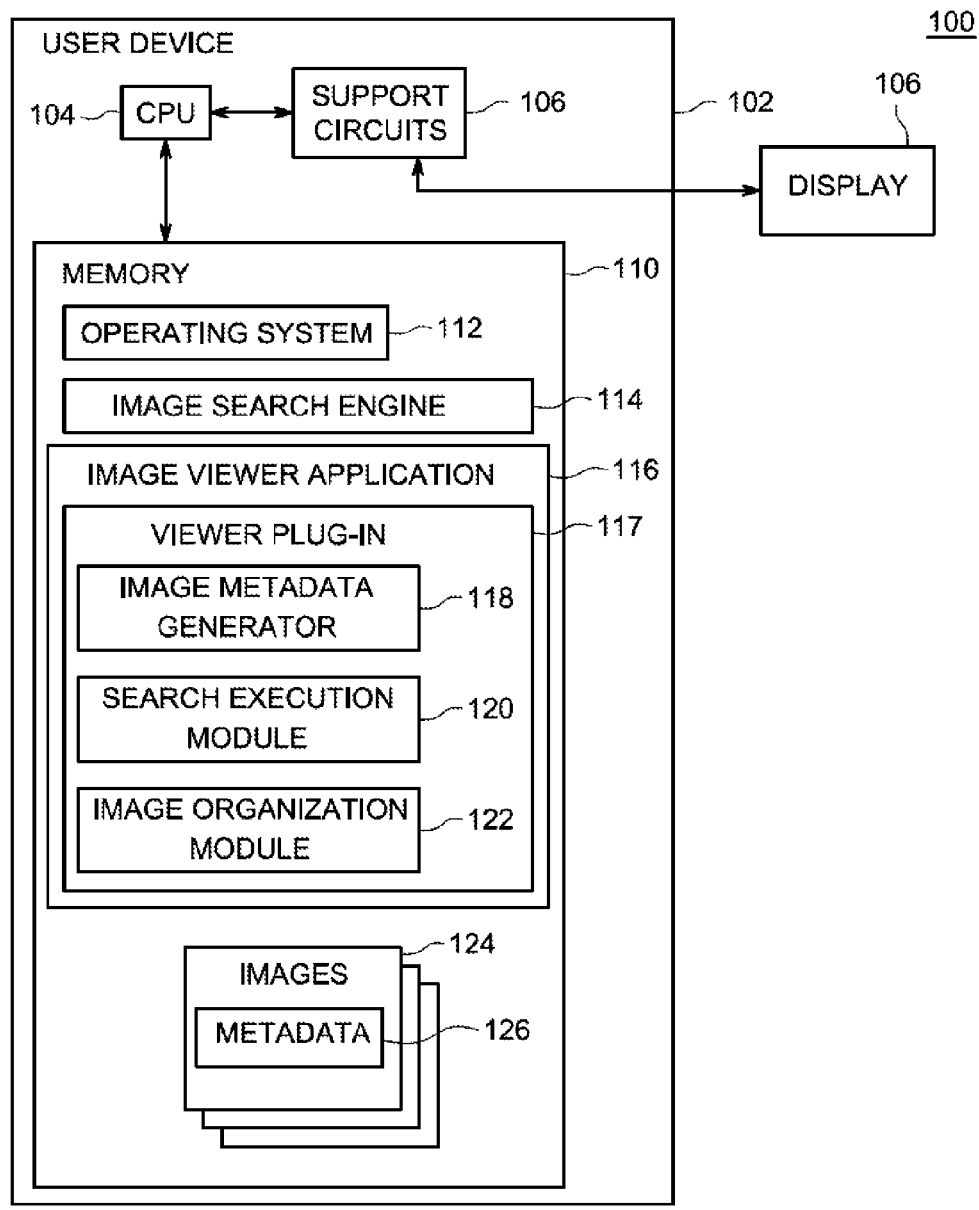
FIG. 1 is a block diagram of an apparatus to save a search query as metadata with an image, according to one or more embodiments.

While the method and apparatus is described herein by way of example for several embodiments and illustrative drawings, those skilled in the art will recognize that the method is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method to save a search query as metadata with an image defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus to save a search query as metadata with an image. The method receives search results from a submitted search string and generates metadata based on the search string. The metadata are selectively associated to any images from search results selected for storage. Additional embodiments allow the metadata associated with the stored images to be used to perform a subsequent search. Thus, users are presented an option to perform a subsequent search using the search string that originally returned the saved image.

As used herein, metadata refers to a set of data about data. In some embodiments, metadata may be descriptive data and based on the search string used to retrieve images. In other embodiments, metadata may be structural data and include information about relationships between data (e.g., a parsed search string may comprise metadata differentiating between adjectives and nouns). The metadata is assigned and used to sort the images from within an image processing application operating on a user device which is used to store the images. In further embodiments, the metadata is used to store the search string for future searches (that is, searches subsequent to an original search) using the search string originally used to find the image, such as via an Internet query. For the embodiments discussed herein, a "metadata tag" may be regarded as an index term or subject heading useful for information retrieval, such as the term "search query". Such metadata tag is an exemplary carrier of metadata content (such as keywords used in a specific search query), however mechanisms other than metadata tags may be used to attach metadata content to an image file.

Advantageously, the methods described herein allow saved images to be recalled and organized using metadata created from search string queries entered by a user. Thus, subsequent searches may be performed by a user that reinforce the accuracy of retrieved images as well as allow the retrieved images to be organized and stored by the search string query metadata. The present embodiments of the invention may be used as a plug-in to an application within a user device such as mobile devices, tablets, and other electronic devices capable of searching and returning images. Such applications include, but are not limited to, ADOBE ACROBAT®, ADOBE PHOTOSHOP®, ADOBE ELEMENTS® and the like. The present invention improves user experience by providing accurate stored image organization and improved image searching.

Various embodiments of a method to save a search query as metadata with an image are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for saving a search query as metadata with an image, according to one or more embodiments. As an example, a user may open an image viewer application 116 to execute an image search by typing in a search string query "famous sunsets". The query "famous sunsets" is submitted to a search engine 114. The search engine 114 returns sixty results to the image viewer application 116. The sixty image results are displayed to the user via a display 108. The user selects one image amongst the sixty image results for local storage. An image metadata generator 118 generates metadata 126 using the "famous sunsets" query and associates the metadata with the selected image for local storage. Thus, upon locally storing an image file 124 on the user device 102, metadata 126 is embedded or associated with the image file 124.

The apparatus 100 includes a user device 102. The user device 102 is a computing user device, for example, a desktop computer, laptop, tablet computer, or smartphone. The user device 102 includes or is attached to a display 108. The user device 102 includes a Central Processing Unit (CPU) 104, support circuits 106, and a memory 110. The CPU 104 may include one or more commercially available microprocessors or microcontrollers that facilitate data processing and storage. The support circuits 106 facilitate the operation of the CPU 104 and include one or more clock circuits, power supplies, cache, input/output circuits, and the like. The memory 110 includes at least one of Read Only Memory (ROM), Random Access Memory (RAM), disk drive storage, optical storage, removable storage and/or the like. Support circuits 106 include modules for processing data for display and peripherals and communication systems to reach a network or the Internet.

The memory 110 includes an operating system 112 and the image viewer application 116, and a plurality of images 124. The application 116 includes a viewer plug-in 117. The viewer plug-in 117 includes an image metadata generator 118, search execution module 120, and an image organization module 122. In some embodiments, memory 110 may also include an image search engine 114. Each image 124 includes metadata 126. The operating system 112 may include various commercially known operating systems. The application 116 may be any document or image reader, such as ADOBE® ACROBAT®, ADOBE® READER®, ADOBE® READER® Mobile, ADOBE® PHOTOSHOP®, ADOBE® PHOTOSHOP® TOUCH® and the like that includes a zoom feature.

In some embodiments, the image search engine 114 may be an external Internet engine such as GOOGLE®. An Internet search engine is a software system that is designed to search for information on the World Wide Web. The search results are generally presented in a line of results often referred to as search engine results page. Thus, in such an embodiment, the GOOGLE® search engine may be embedded into the application 116 to search the Internet.

In other embodiments, the image search engine 114 may be on the user device 102 or secure database and the like. The image search engine 114 in this embodiment is a program for the retrieval of data from a database of network. For example, the image search engine 114 is the local find text box in MICROSOFT® WINDOWS®. In some embodiments, when a user initiates an image search via the Internet by entering a search string into an Internet search engine, results are returned to the application 116. In other embodiments, when a user initiates a search elsewhere, such as on the user device 102, with the image search engine 114, results are also returned to the application 116. In both embodiments, the application 116 allows images 124 to be saved locally by prompting the user with an option to save upon selection of an image result by the user. Metadata 126 is created using the search string that returned the image file 124 in search results as either the whole search string or parsed terms from the search string. For example, a search string of "Aruba sunsets in July" may be stored in its entirety or the search string may be stored as "Aruba", "Sunsets", and "July".

The format in which search query is saved depends on the application or application developer. The string whether entire or parsed, is stored in all the scenarios whenever the searched image is saved on the user device 102 and the search query string is embedded as the image metadata 126. A decision to save the query as entire string requires the entire string to be embedded as metadata in the image and in case of parsed string. The entire string is divided into sub-strings and can use an exclusion filter where that specifies what sub-strings want to exclude. Following the example above, the search string: "Aruba Sunset in July" includes the sub-string "in" which as a preposition can be excluded by the exclusion filter.

The metadata 126 is then assigned to the images 124 that are selected among the search results for local storage by the application 116 or viewer plugin 117. In some embodiments, the assigned metadata 126 is used for future search execution via the search execution module 120. In other embodiments, the assigned metadata 126 is used to organize locally saved images 124. The organization of locally saved images includes using the search string metadata to rename directories, or nested directories of specific types of images, as will be further discussed below with respect to FIGS. 2-5B.

Further embodiments may prompt a user using the viewer plug-in 117 with an option to search again using previous search terms stored in the metadata 126. A user may be shown a drop down menu or a list populated with terms from the previous search string that upon selection, initiates a subsequent image search on the image search engine 114 via the search execution module 120.

Although in the described embodiments the images are stored on a local user device, in other embodiments, the images and associated metadata may be stored by the user in a networked device or server, or in the cloud as part of a service to which the user subscribes. All such user controlled storage techniques are contemplated for use with the embodiments described herein.

Figure 2:
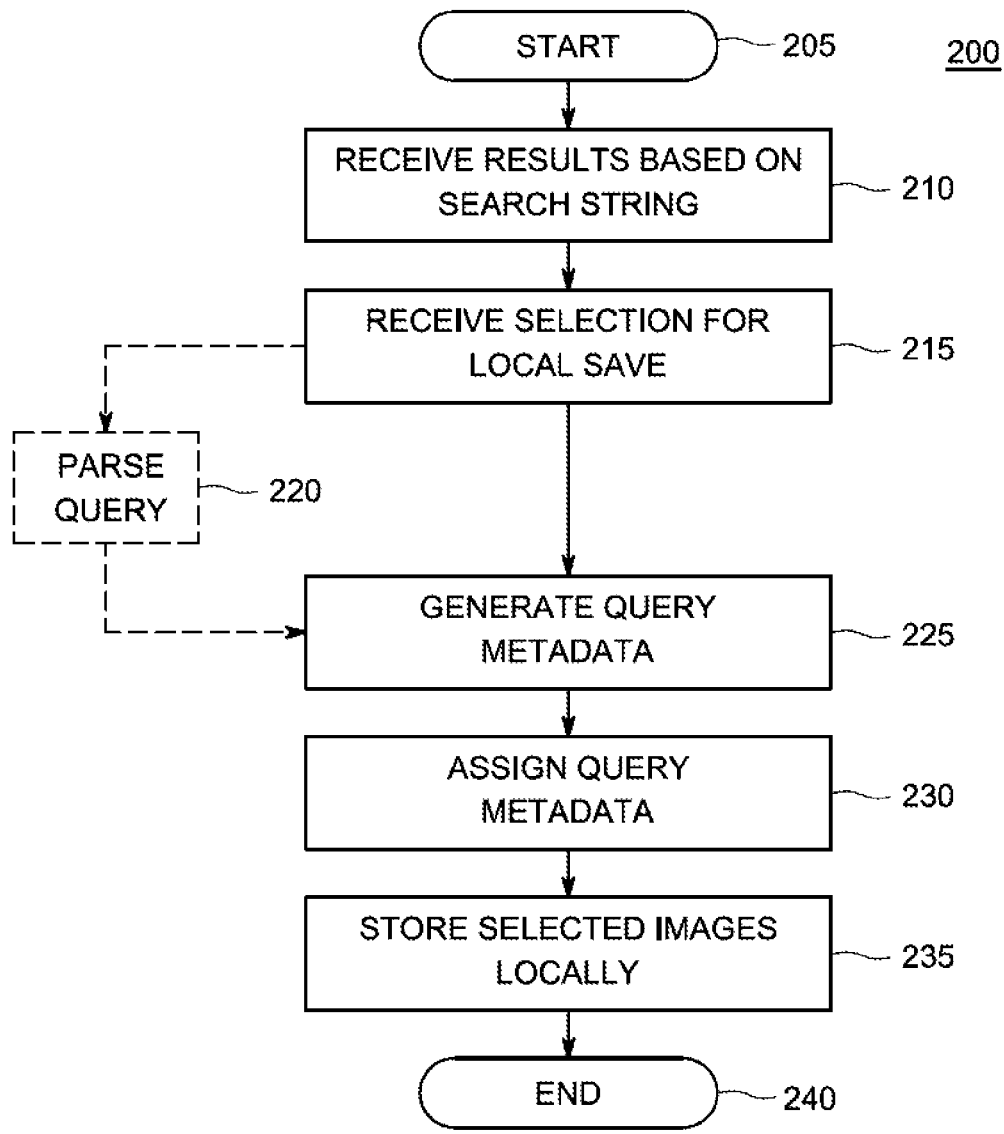
FIG. 2 depicts a flow diagram of a method for creating metadata for images based on a user search string as performed by the image metadata generator of FIG. 1, according to one or more embodiments.

FIG. 2 depicts a flow diagram of a method 200 for creating metadata for images based on a user search string as performed by the image metadata generator 118 of FIG. 1, according to one or more embodiments. The method 200 as performed by the image metadata generator module in the application 116 of FIG. 1, saves a search query as metadata with an image from within an image processing application.

The method 200 begins at step 205 and proceeds to step 210 wherein the method 200 receives image search results from an image search string query. For example, a user may enter into a search engine, a query for images using a string query, "famous sunsets" via ADOBE PHOTOSHOP TOUCH®. The search engine returns images that are relevant to famous sunsets, including views from picturesque lookout points to advertisements to personal family pictures posted on social media to the user device. The images are displayed in the application 116.

The method 200 proceeds to step 215, where the method 200 receives a selection among the received image search results as image files for local storage. Continuing the above example, the user enters into the device commands to select at least one image to be saved locally. A selection may be made via an input/output peripheral such as by touching a touchscreen, clicking with a mouse, or highlighting with a cursor, and the like. Thus, a user may for example, touch an image to highlight the image as a selection for local storage on the tablet.

The method 200 optionally proceeds to step 220, where the method 200 also parses the search string query. For example, the search string query "famous sunsets" may be parsed into the individual words or sub-strings of "famous" and "sunsets". The individual words or sub-strings are thus allocated as individual terms allowing for greater organizational accuracy by reducing a search string query to its base terms. Thus, "famous" and "sunsets" each represent metadata. The method 200 proceeds to step 225, where the image metadata generator 118 generates metadata based on the entire search string and/or parsed search string query.

The metadata 126 can be entire search query string or parsed search query string based on the logic used by the application developer. Should the entire search query string be stored, the entire string is embedded as metadata 126 in the image 124 whereas in case of parsed string being saved, the filtered sub-strings resulting from applying the exclusion filter logic, is embedded in the metadata.

The method 200 proceeds to step 230, where the method 200 associates the metadata with the selected image files. Such association can be based on formation of a metadata tag specifically designated for "search queries". Such a tag may be represented by the computer readable code <search_query>. For the above example, the metadata tag and metadata content would look like <search_query>famous_sunsets</search_query>. Such metadata may be embedded with the image file(s) that are locally stored, stored in a look-up table (LUT), or otherwise specifically associated with the corresponding selected image from the search string query. Thus, the keyword content "famous" and "sunsets" would be stored as a metadata for at least one of the images selected from the returned search results for local storage.

The method 200 proceeds to step 235, where the method 200 stores the selection of image files on a local user device with the metadata via the image processing application. Continuing the example above, the selected images are then stored on the user device using the native file extensions of the operating system conventions on the user device. In some embodiments, the naming of the files may be manually entered by the user. In other embodiments file names are automatically generated using the application. For embodiments with automatic generation, the locally saved image files may be named using metadata of the search string query, for example: famous_sunsets1.psd, famous_sunsets2.psd, famous_sunsets3.psd, etc. Further embodiments may organize the files into the same directory or by names of the directories, such as a directory named "famous_sunsets" or merely "sunsets". The method 200 proceeds to step 240 and ends.

Figure 3:
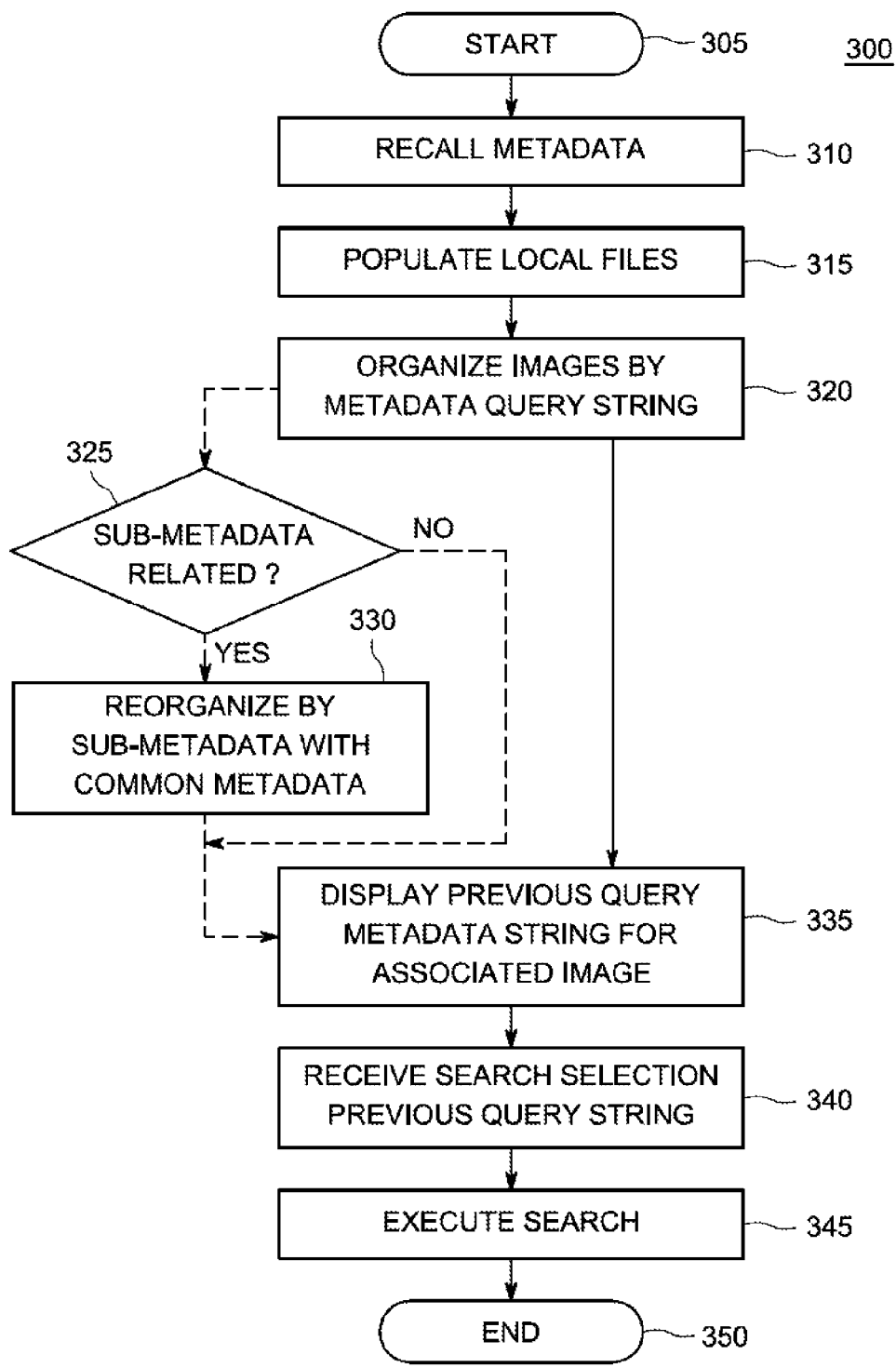
FIG. 3 depicts a flow diagram of a method for recalling images based on metadata as performed by the image organization module of FIG. 1, according to one or more embodiments.

FIG. 3 depicts a flow diagram of a method 300 for recalling images based on metadata as performed by the image organization module 122 of FIG. 1, according to one or more embodiments. The method 300 recalls and organizes locally stored images based on metadata from previous search queries. For example, a user may have many stored images. The user views the images in the application 116 that is capable of recalling and reorganizing the files based on metadata associated or embedded with each image file. The application 116 also provides the user the ability to execute a subsequent search using the metadata for an image file selected by the user.

The method 300 begins at step 305 and proceeds to step 310, where the method 300 recalls the metadata. Continuing the example from above, the method 300 may recall metadata generated in method 200 from the search for "famous sunsets". In some embodiments, the method 200 recalls the metadata as individual words recalled as embedded in the locally saved images.

The method 300 proceeds to step 315, where the method 300 uses the recalled metadata to populate corresponding local image files saved from the search for "famous sunsets". The method 300 displays the image files that were retrieved with the search term "famous sunsets". Thus the method 300 presents a display of locally saved images.

The method 300 proceeds to step 320, where the method 300 organizes local images by metadata based only on the entire search string query used to locate the image. Continuing the example above, the local image files may be saved into the same directory as the previous saved image files. The directory having the same "famous sunsets" search string metadata.

The method 300 may optionally proceed to step 325, where the method 300 determines whether sub-string or subsets of the metadata are related. Sub-string referring to parsed individual words of the full string and subsets as groups of words as discussed above. The method 300 determines whether previous locally saved images from previous executions of the method 200 resulted in the saving of images with the same metadata by comparing the recalled metadata and grouping files with the same metadata in the same directory. Thus, continuing the example above, a user may have searched and stored images from multiple queries such as "beach sunsets" and "cityscape sunsets". Since both may invariably include sunsets that are famous and returned from the current search of "famous sunsets", step 325 determines the intersection of these saved images by comparing metadata for common metadata 126 among the image files 124.

The method 300 proceeds to step 330, where the method 300 reorganizes the image files by the sub-metadata based on commonality of the metadata—that is, having the same keywords. From the example above, the method 300 then sorts the images of "famous beach sunsets" or similarly, "cityscapes" that have associated metadata including "famous" and "sunsets", to also be included in a directory for "famous sunsets".

The method 300 proceeds to step 335 where the method 300 displays previously submitted search strings for a selected local image. The method 300 displays previously submitted search strings based on the metadata. Thus, a highlighted image file saved from a previous search for "famous sunsets" displays to the user an option to search again for "famous sunsets". Similarly, another highlighted image file shows "cityscapes" if such a file originated from a search for "cityscapes". In other embodiments, implementing matching related sub-metadata, the method 300 displays an image of a famous cityscape during sunset that includes an option to search for "famous sunsets", "cityscapes", and "famous cityscape sunsets".

The method 300 proceeds to step 340 where the method 300 receives a selection from the display of previous searches. For example, the user may select "cityscapes" to initiate another search of cityscapes.

The method 300 proceeds to step 345, where the method 300 executes the search. The selected previously submitted search string used for a selected local image is executed. For example, the method 300 may execute a search for "cityscapes" and ultimately displays the results from the search.

The selection of results from the search is performed as described using method 200. The method 300 proceeds to step 350 and ends.

Figure 4:
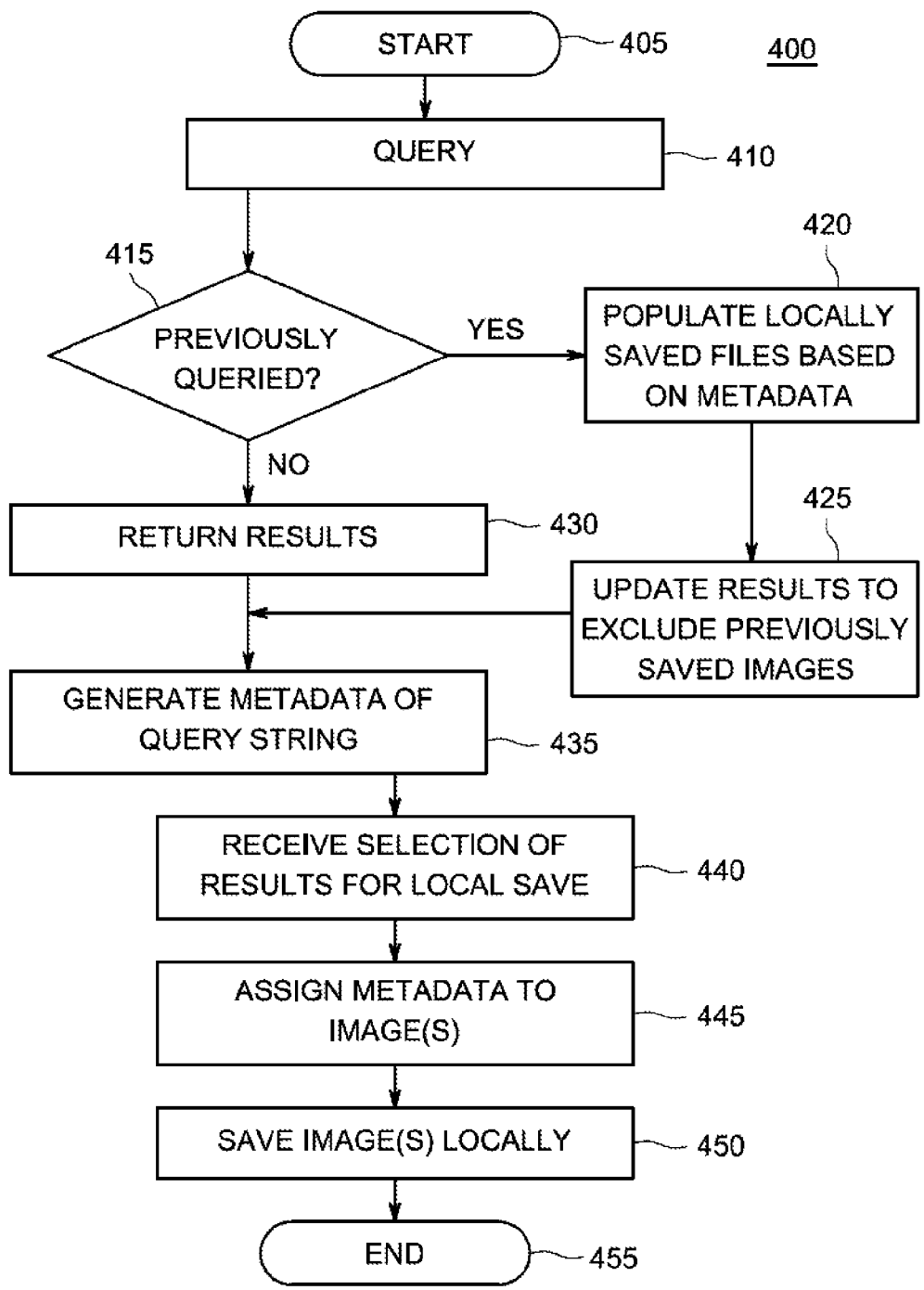
FIG. 4 depicts a flow diagram of a method for creating metadata for images after subsequent searches using existing metadata as performed by the search execution module and image organization module of FIG. 1, according to one or more embodiments.

FIG. 4 depicts a flow diagram of a method 400 for creating metadata for images after subsequent searches using existing metadata as performed by the search execution module 120 and image organization module 122, according to one or more embodiments. The method 400 begins at step 405 and proceeds to step 410 where the method 400 receives a search string query. Continuing the example above, another search string after "famous sunsets" is entered by the user, such as "sourdough bread".

The method 400 proceeds to step 415, where the method 400 determines whether the string has been previously submitted based on existing locally stored metadata of the image files. The method 400 compares the current search string with the metadata of locally stored images. Following the example, "sourdough bread" would be compared to metadata of all locally saved images including those saved from a previous search for "famous sunsets".

If the search string has not been previously queried, the method 400 proceeds to step 430 where the method 400 returns image results based on the new search string. The method 400 displays the returned images relevant to search string "sourdough bread".

The method 400 proceeds to step 435, where the method 400 generates metadata based on the search string. As described previously, metadata are created for the words "sourdough bread" and separately, "bread" and "sourdough".

The method 400 proceeds to step 440 where the method 400 receives a selection of one or more images among the results for local storage. The selection may be made by a user by touching a touchscreen, highlighting with a keyboard, clicking with a mouse, or other input peripheral device.

The method 400 proceeds to step 445, where the method 400 assigns a metadata tag, such as a tag indicating that the metadata content is a search string (that is, <search_query>), to the selected images. The method 400 proceeds to step 450, where the method 400 saves the selected images locally along with the metadata tag "<search_query>" as well as metadata content within that tag which describes that search query. From the previous example, images stored locally from such a search query have metadata content of "sourdough bread", "sourdough", and "bread". The method 400 then ends at step 455.

If however, at step 415, the method 400 determines the query has been previously submitted, the method 400 proceeds to step 420. At step 420, the method 400 populates locally saved files based on metadata from the corresponding previous search. For example, the method 400 may display locally saved images from a previous search for "sourdough bread". Alternatively, such files may be populated for processing and not displayed but rather temporarily allocated in memory.

The method 400 proceeds to step 425, where the method 400 updates current search results to exclude duplicate files. Thus, previously saved local image files from a previously submitted search of "sourdough bread" located in memory are compared to current search results (that is, a search is performed as described above for step 430 to obtain current search results). The obtained current search results are then updated to exclude the previously saved image files. Exclusion of duplicate image files can be done by image file comparisons, such as by analysis of image pixels, image size, file size, file name, originating URL, or a combination of such factors. Alternatively to exclusion, the duplicate files may also be marked for separate display under a tab titled "search results from locally saved files".

The method 400 proceeds to steps 435-455 as discussed above. The exclusion of the previously saved images from the returned image results thus ensures no duplicate images are locally saved.

Figure 5A:
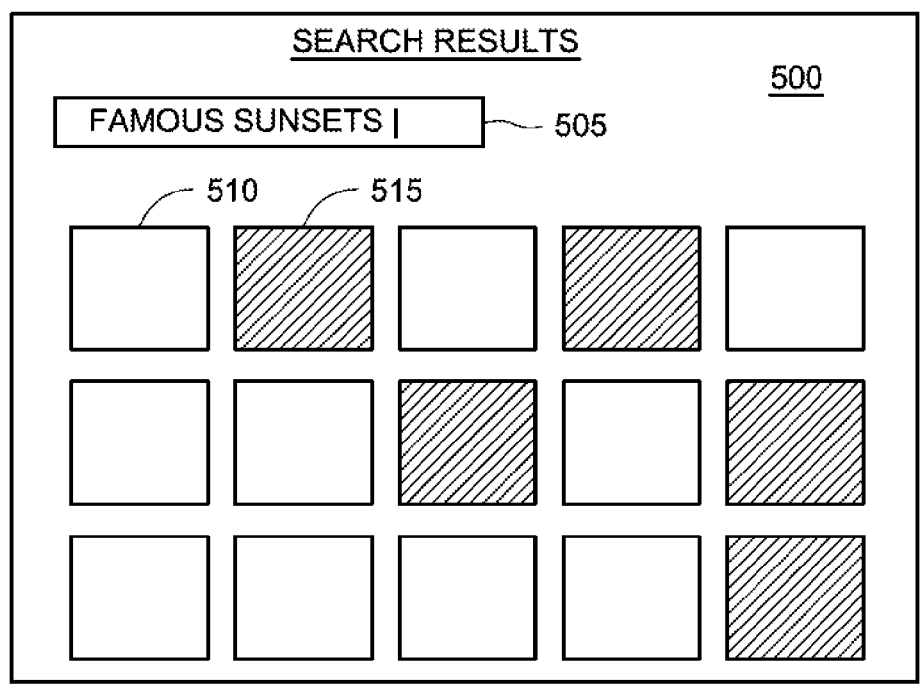
FIGS. 5A and 5B are exemplary depictions of image results 500 returned from a search, and automated organized local images using the system in FIG. 1, according to one or more embodiments.
Figure 5B:
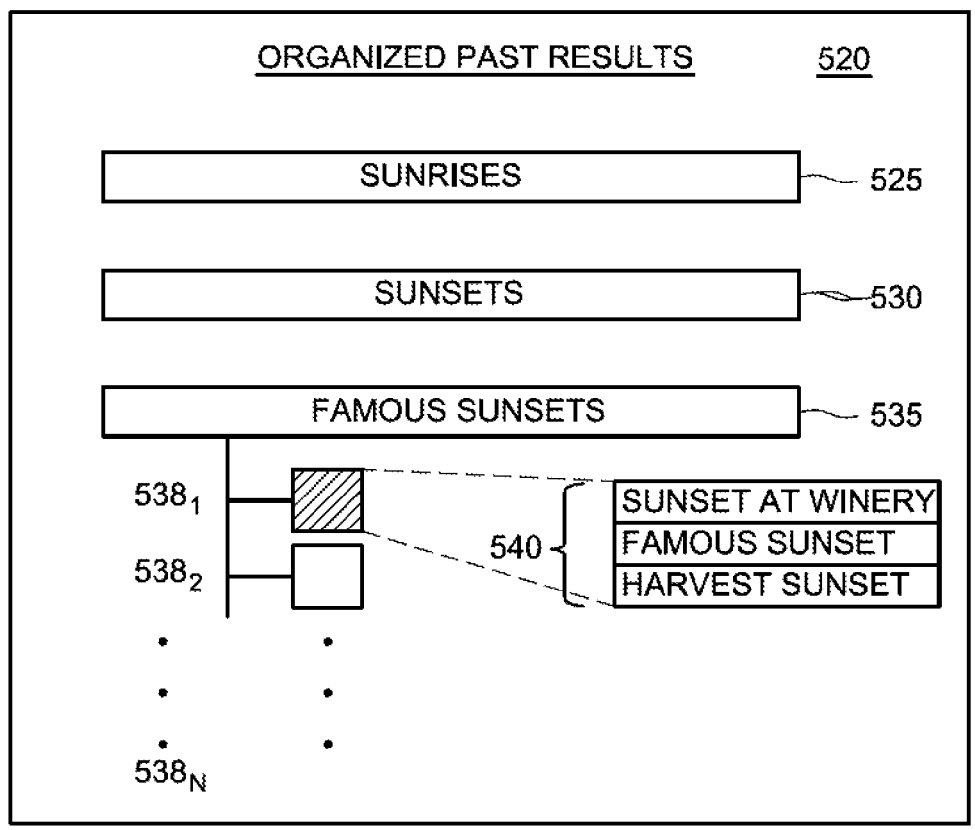

FIGS. 5A and 5B are exemplary depictions of image results 500 returned from a search, and automated organized local images using the system in FIG. 1, according to one or more embodiments. As an example, a user opens an application 116 and enters a search string 505 that is submitted to an image search engine 114. In this example, the results 500 displayed for the search string 505 entered by the user comprises image results 510 from the Internet. Alternative embodiments may include results from a large image database instead of the Internet. The user may choose selected results 515 for local storage. Selected results 515 are exemplary depicted as patterned boxes while image results 510 that are unselected are depicted as white boxes. The grid of boxes comprising an exemplary layout for results 500.

Other embodiments include variations of displaying to users in the opened application 116, images in other layouts. For example, images may displayed in a native manner of the application 116 and a user interface option is provided to generate a particular layout such as a grid, list, and the like. As will be discussed below with respect to FIG. 5B, a user may be provided an option to search using metadata option when the user right clicks, mouse overs, touches, highlights or otherwise selects an the image. In another embodiment, a user may be displayed a search box having metadata as default search string with an option for user to customize the subsequent search. Customization may add more keyword terms or other combination of metadata based search with other advanced search options limited criteria such as time created, image dimensions, image file size, and the like.

Further embodiments provides overlays on mouse over of an image or image icon. For example when user hovers mouse over an image then metadata is shown. Alternatively, the metadata is shown by default as an overlay over images that may be selected to implement a subsequent search. The overlays may be opaque, transparent, or a combination of the two as to not overtly distort the underlying image.

FIG. 5B is an exemplary depiction of automated organized local images 520, according to one or more embodiments. As an example, the user subsequently opens the application 116 again, for locating locally stored image files 126 or performing another image search. FIG. 5B depicts an example of organized locally saved images displayed to the user. In some embodiments, the local images 520 are sorted by metadata that has been generated and assigned to the images based on the search string 505. The organized local images 520 comprise an organization of stored local images into separate different directories. An exemplary first directory 525 comprises previously locally stored images that are images of "sunrises", resultant from a previous search string for "sunrises". The exemplary second directory 530 and third directory 535 comprise images from the search string 505. The second directory 530 in this example comprises images locally stored based on a search query of "sunsets". The third directory 535 in this example comprises images locally stored based on a search query of "famous sunsets".

In some embodiments, the second and third directories (530 and 535) may comprise separate copies of the commonly associated images files since the third directory 535 contains a nested search query of the second directory 530. In other words, sunsets that are famous, are also sunsets. Thus the third directory 535 may be a nested directory of the second directory 530. In other embodiments, the third directory 535 may comprise links to associated files commonly stored in the second directory 530.

Individual locally stored images ($538_1$, $538_2$, ... $538_N$) are associated with the search string(s) 540 that were used to initially find the images. Thus, the search history used to previously find the image is stored in embedded metadata within the image. The metadata is independent of the web browser history or initial web search engine. The methods and apparatus disclosed herein generate previously executed search strings 540 based on the metadata 126 saved with the locally stored image file 124. Thus, a prompt may be shown to a user based on a mouse over, right click, tap gesture, or other input means, for selection of the associated image file $538_1$ and search string metadata useful for a subsequent search to find similar images. Further embodiments may also rely on different directory names for subsequent search queries.

Figure 5C:
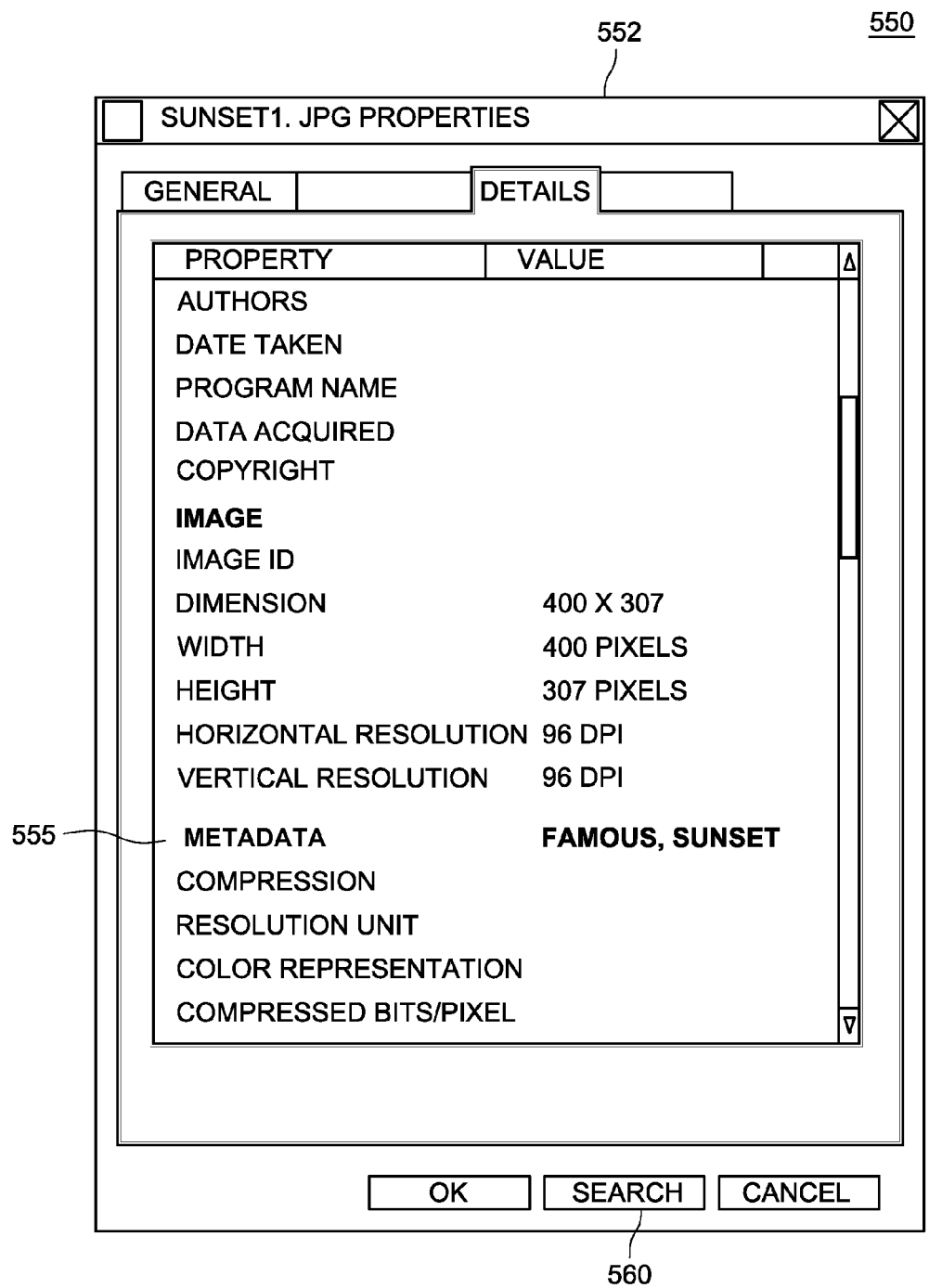
FIG. 5C is an exemplary depiction of a graphical user interface for a locally stored image using the system in FIG. 1, according to one or more embodiments.

FIG. 5C is an exemplary depiction of a graphical user interface 550 for a locally stored image using the system in FIG. 1, according to one or more embodiments. The exemplary graphical user interface 550 is of the file properties 552 of an image entitled "Sunset1". The file properties 552 include metadata variables 555. The file properties 552 also include an option to search 560 using the metadata in search engine 114.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving a first set of image search results from a first search comprising an image search string;
receiving one or more image files for storage based on at least one user selection from the first set of image search results;
generating, by at least one processor, metadata comprising the image search string from the first search;
associating the metadata with the one or more image files;
storing the one or more image files with the associated metadata;
accessing the metadata based on detecting a selection of a stored image file from the one or more stored image files;
based on the metadata, providing, for presentation in a graphical user interface on a display device, an option to perform a second search using only the image search string;
performing the second search with only the image search string in response to a selection of the option;
in response to performing the second search, receiving a second set of image search results that matches the first set of image search results;
comparing the second set of image search results to the one or more stored image files; and
providing, for presentation in the graphical user interface, the second set of image search results excluding the one or more stored image files.

2. The method of claim 1, wherein associating the metadata with the one or more image files comprises embedding the metadata as a tag with the one or more image files.

3. The method of claim 2, wherein storing comprises using the metadata to organize the one or more stored image files into different named directories.

4. The method of claim 3, wherein organizing the one or more stored image files further includes arranging user selected image icons based on the one or more stored image files into a visual grid display.

5. The method of claim 1, wherein providing the second set of image search results excluding the one or more stored image files comprises:
providing the second set of image search results excluding the one or more stored image files in a first portion of the graphical user interface; and
providing the one or more stored image files in a second portion of the graphical user interface, the second portion of the graphical user interface being in a separate application tab.

6. The method of claim 1, wherein generating metadata comprises parsing the image search string into individual words.

7. The method of claim 6, wherein storing comprises analyzing the metadata of the one or more stored image files to create nested directories based on the individual words of the metadata.

8. An apparatus for saving a search string as metadata with an image comprising:
at least one processor; and
a non-transitory computer readable storage medium comprising instructions that, when executed by the at least one processor, cause the apparatus to:
receive a first set of image search results from a first search comprising an image search string in a search engine;
receive one or more image files based on at least one user selection from the image search results;
generate metadata comprising the image search string from the first search;
store the one or more image files with the metadata;
access the metadata based on detecting a selection of a stored image file from the one or more stored image files;
based on the metadata, provide, for presentation in a graphical user interface, an option to perform a second search using only the image search string;
perform the second search with only the image search string in response to a selection of the option;
in response to performing the second search, receive a second set of image search results that matches the first set of image results;

compare the second set of image search results to the one or more stored image files; and provide, in the graphical user interface, the second set of image search results excluding the one or more stored image files.

9. The apparatus of claim 8, further comprising instructions that, when executed by the at least one processor, cause the apparatus to embed the metadata with the one or more image files.

10. The apparatus of claim 9, further comprising instructions that, when executed by the at least one processor, cause the apparatus to:

use the embedded metadata to organize the one or more stored image files into different directories, and arrange user selectable image icons based on the one or more stored image files into a visual grid display.

11. The apparatus of claim 8, further comprising a display device for displaying the one or more stored image files and their associated metadata.

12. The apparatus of claim 8, further comprising instructions that, when executed by the at least one processor, cause the apparatus to provide the second set of image search results excluding the one or more stored image files by:

identifying one or more image files from the second set of image results that were not previously stored;

displaying the identified one or more image files that were not previously stored in a first subset of image results; and displaying the one or more stored image files in a second subset of image results, the second subset of image results comprising a label indicating that the second subset of image results previously saved image files.

13. The apparatus of claim 8, further comprising instructions that, when executed by the at least one processor, cause the apparatus to parse the image search string into individual words for generating the metadata.

14. A non-transitory computer readable medium for storing computer instructions that, when executed by at least one processor causes the at least one processor to perform a method for saving a search string as metadata with an image comprising:

receiving a first set of image search results from a first search comprising an image search string;

receiving one or more image files for storage based on at least one user selection from the image search results;

generating metadata based on the image search string;

storing the one or more images files with the metadata;

accessing the metadata based on detecting a selection of a stored image file from the one or more stored image files;

based on the metadata, providing, for presentation in a graphical user interface on a display device, an option to perform a second search using only the image search string;

performing the second search with only the image search string in response to a selection of the option;

in response to performing the second search, receiving a second set of image search results that matches the first set of image search results;

comparing the second set of image search results to the one or more stored image files; and providing, in the graphical user interface, the second set of image search results excluding the one or more stored image files.

15. The non-transitory computer readable medium of claim 14, further comprising associating the metadata with the one or more image filesby embedding the metadata as a tag with the one or more stored image files.

16. The non-transitory computer readable medium of claim 15, wherein storing comprises using the associated metadata to organize storage of the one or more stored image files.

17. The non-transitory computer readable medium of claim 16, wherein storing comprises organizing the one or more stored image files into different named directories based on the associated metadata, and arranging user selectable image icons based on the one or more stored image files into a visual grid display.

18. The non-transitory computer readable medium of claim 14, wherein providing the second set of image search results excluding the one or more stored image files comprises:

providing the second set of image search results excluding the one or more stored image files in a first portion of the graphical user interface; and providing the one or more stored image files in a second portion of the graphical user interface, the second portion of the graphical user interface being in a separate application tab.

19. The non-transitory computer readable medium of claim 14, wherein generating metadata comprises parsing the image search string into individual words.

20. The non-transitory computer readable medium of claim 19, wherein storing comprises analyzing the metadata of the one or more stored image files create nested directories based on the individual words of the metadata.

* * * * *